United States Patent [19]

Wegmann et al.

[11] 3,900,286

[45] Aug. 19, 1975

[54] DYESTUFF PREPARATIONS AND PROCESSES FOR THE DYEING OF SYNTHETIC ORGANIC MATERIAL

[75] Inventors: Jacques Wegmann, Bettingen; Richard Peter, Basel, both of Switzerland

[73] Assignee: Ciba-Geigy AG, Basel, Switzerland

[22] Filed: Nov. 13, 1972

[21] Appl. No.: 305,769

[30] Foreign Application Priority Data
Nov. 19, 1971  Switzerland............... 016869/71
Nov. 19, 1971  Switzerland............... 016870/71

[52] U.S. Cl. .................. 8/172; 8/173; 8/174; 8/178 R; 8/179; 8/85
[51] Int. Cl. ................................. D06p 5/06
[58] Field of Search............. 8/85, 172, 173, 178 R, 8/174, 179; 260/314.5

[56] References Cited
UNITED STATES PATENTS

| | | | |
|---|---|---|---|
| 1,594,490 | 8/1926 | Bertolet | 8/94 |
| 2,816,115 | 12/1957 | Howell | 260/314.5 |
| 2,955,902 | 10/1960 | Merian | 8/79 X |
| 3,467,485 | 9/1969 | Schaeuble et al. | 8/178 R X |
| 3,506,990 | 4/1970 | Richardson et al. | 8/178 R X |
| 3,528,761 | 9/1970 | Keller et al. | 8/178 R X |
| 3,738,803 | 6/1973 | Blanc et al. | 8/173 X |
| 3,758,272 | 9/1973 | Datye et al. | 8/172 |
| 3,764,262 | 10/1973 | Hildebrand et al. | 8/173 X |

OTHER PUBLICATIONS
PVP and Its Applications, Holmes et al., Proc. Am. Ass'n. of Textile Chemists and Colorists, Sept. 26, 1955, pp. 702–704.
Polyvinyl Pyrrolidone, Hansen et al., Proc. Am. Ass'n. of Textile Chemists and Colorists, Feb. 1, 1954, pp. 72–74.

*Primary Examiner*—Benjamin R. Padgett
*Assistant Examiner*—P. A. Nelson
*Attorney, Agent, or Firm*—Joseph G. Kolodny; Edward McC. Roberts; Prabodh I. Almaula

[57] ABSTRACT

Dyestuff preparations are described consisting of 5 to 80% of a finely dispersed dispersion dyestuff having a maximum particle size of 10 $\mu$; 5 to 200%, relative to the amount of dyestuff, of a low polymeric compound which is soluble in halogenated hydrocarbons, and which contains at least two CO-groups bound to at most two substituted N-atoms, preferably of a polyurea, polyamide or polyvinylpyrrolidone type, and 20 to 95% relative to the dyestuff preparation, of an inert, non-volatile, organic compound, soluble in halogenated hydrocarbons and having a boiling point of above 200°C, the said organic compound containing, in addition to carbon and hydrogen, at most halogen atoms, or oxygen bound solely to carbon atoms, and having a molecular weight of 100 to 10,000, especially paraffin oil or hard paraffin.

The said preparations, liquid or solid, are especially useful for the manufacture of organic dye liquors preferably from perchloroethylene which can be used for the dyeing of organic textile materials consisting of polyester, polyamide or polyacrylonitrile.

15 Claims, No Drawings

DYESTUFF PREPARATIONS AND PROCESSES FOR THE DYEING OF SYNTHETIC ORGANIC MATERIAL

The invention relates to new dyestuff preparations, to their production, as well as to their use for the preparation of dye liquors from organic solvents for the dyeing of synthetic organic material, particularly textile material, and to the synthetic organic material, as an industrial product, dyed with these dye liquors.

The dispersion dyestuffs constitute an important class of dyestuffs for the dyeing of synthetic organic materials, particularly textile materials, from an organic medium. They have, on the one hand, adequate affinity to the material but are, on the other hand, when an organic solvent is used as the dyeing medium, difficultly soluble, and thus have to be employed as fine dispersions. This is a factor which presents considerable problems with regard to the commercial form in which such dyestuffs are supplied.

Highly concentrated preparations, ranging from liquids to pastes, may be considered as suitable commercial forms. These preparations not only must be easy to disperse in the dye medium to form stable dispersions, but must also remain stable in storage; and in the event of a drying up of the preparations, which should normally not occur, the subsequent re-dispersion of the dry dyestuff must be possible.

More desirable than pastes, however, are solid pulverulent preparations which can be dispersed by a simple sprinkling of the powder into the solvent.

Dyestuff preparations are now known from the Belgian Pat. No. 750,232 which consist of finely ground dyestuff, containing no water-solubilising groups, and an organic liquid, such as an oily petroleum fraction, in which the dyestuff does not dissolve at all or dissolves only partially. The dye liquors prepared from these preparations, however, are not stable to heat.

Preparations according to DOS No. 2,041,023, which are employed in a process for the dyeing of polymeric materials, in which process the polymer material is treated in an organic liquid, particularly in perchloroethylene, containing a stable deflocculated dispersion consisting of a dyestuff, having a fine particle size, and a deflocculating agent, e.g. polyurea, are not capable of re-dispersion after drying up of the dyestuff preparation has occurred. Similar disadvantageous properties are shared moreover by the dyestuff mixtures known from DOS No. 2,041,033, the said mixtures consisting of a dispersion of a dyestuff in an organic solvent and a polyurea.

And, finally, dyestuff preparations are known from the French Pat. No. 1,580,142 which consist of, in particular, a pigment, a dispersing agent such as polyvinylpyrrolidone, and a liquid hydrocarbon, the said preparations being used in the manufacture of inks. These preparations too, however, lack the property of re-dispersion.

It has now been found that dispersion dyestuffs difficultly soluble in the organic solvent can be formed into liquid to solid preparations not having the above defined disadvantages, the said preparations giving dispersions stable at the boiling temperature of the organic solvent and possessing, moreover, the property enabling them to be re-dispersed after their drying up has occurred.

These new dyestuff preparations contain, besides finely dispersed dispersion dyestuff having a maximum particle size of 10 $\mu$, a combination consisting of a low-polymeric compound which is soluble in halogenated hydrocarbons and which contains at least two CO-groups bound to, at most, two substituted N-atoms; and an inert, non-volatile, highly viscous to solid, organic compound soluble in halogenated hydrocarbons and having a boiling point of about 200°C, the said organic compound containing, in addition to carbon and hydrogen, at most halogen atoms, or oxygen bound solely to carbon atoms, and having a molecular weight of 100 to 10,000. There can moreover be optionally present, added during the production process, halogenated hydrocarbons such as, in particular, perchloroethylene.

The particle size of the dispersion dyestuffs, i.e. of such dyestuffs having a minimum solubility of about 1 to 100 mg/l of water (ca. 80°C), must be below 10 $\mu$ (micron), since otherwise there is the possibility of filtration phenomena being observed in the case of wound packages, and sedimentation occurring in the dye bath. Preferably, the particle size of the dyestuffs does not exceed 5 $\mu$: it is especially 1 to 2 $\mu$.

The solubility of the dispersion dyestuffs, which, as mentioned, amounts in water to only a few milligrams, can be somewhat higher in the organic solvent, such as perchloroethylene; it should, however, not as a rule appreciably exceed 100 mg at room temperature, and 1 g at boiling temperature.

Dyestuffs satisfying these requirements belong to the most diverse classes, such as, for example, azo dyestuffs, particularly monoazo and disazo dyestuffs, azomethines, stilbene derivatives, naphthoquinone and anthraquinone derivatives, and the most varied heterocycles such as quinophthalone, perinone, oxazine and phthalocyanine dyestuffs. Further suitable dyestuffs are nitro, nitroso, styryl, azamethine, polymethine and azostyryl dyestuffs. It is also possible to use metal complex dyestuffs of copper, nickel, chromium, cobalt, iron and aluminium, which possess affinity to synthetic fibres and correspond in character to dispersion dyestuffs. The dyestuffs can moreover optionally also contain reactive groups.

These dyestuffs are present preferably in amounts of 5 to 80%, particularly 10 to 50%, relative to the dyestuff preparation.

Furthermore, the dyestuff preparations according to the invention contain, as a component of the combination according to the invention, 5 to 200%, especially 10 to 50%, relative to the amount of dyestuff, of a low-polymeric compound which is soluble in perchloroethylene, and which contains at least two CO-groups bound at most to two, especially to one, substituted N-atom(s). Suitable compounds in this case are, for example, polyureas, polyamides and polyvinylpyrrolidones; the polyurea types are described in DOS No. 2,041,033, the polyamide types in the British Pat. No. 573,482, and the polyvinylpyrrolidone types in the French Pat. No. 1,580,142.

Polyamides which behave particularly favourably are ones having a molecular weight of 1000 to 8000, such as are obtainable commercially under the designations "Versamid 900, 930, 935, 940, 950, 961, 962 and 963". Preferably, however, substances are used which contain the amide groups in ring form, such as in the case of the derivatives of polyvinylpyrrolidone, and which are obtainable commercially, e.g. under the name of "Antaron V 216 and V 220", and have a molecular weight of about 7000 to 9000. It is desirable to keep the proportion of low-polymeric compound as low as possible not only on account of the relatively high price, but also on account of the fact that higher amounts have a clear retaining action on certain dyestuffs, resulting in less favourable exhaustion values.

The dyestuff preparations according to the invention contain, as further component of the combination, nonvolatile organic compounds which contain in the molecule, in addition to carbon and hydrogen, at most halogen atoms, or oxygen bound solely to carbon atoms, and which have a molecular weight of from 100 to 10,000, preferably from 150 to 5000. These compounds should moreover have a boiling point exceeding 200°C.

Since the dyestuff preparations according to the invention may be either solid or liquid, both solid and liquid non-volatile, organic compounds are suitable.

Highly viscous compounds, e.g. paraffin oil or phthalic acid dimethyl ester, are suitable for liquid dyestuff preparations, whereas for solid dyestuff preparations, particular mention may be made of hard paraffin, dicyclohexylphthalate, polyethylene waxes, polystyrene and copolymers with butadiene, also natural and synthetic ester waxes such as Hoechst Wachs E and RT, also carnauba wax, beeswax, as well as polyoxymethylene or -propylene compounds. Of special interest are also mixtures of the said non-volatile organic compounds, e.g. a mixture of paraffin or polystyrene and a styrene-butadiene copolymer or a mixture from polystyrene and paraffin in a mixture rate of about 1:1.

The proportion of non-volatile organic compound is, depending on the desired concentration, from 20 to 95%, particularly from 40 to 80%, relative to the dyestuff preparation.

These non-volatile organic compounds should be readily soluble in perchloroethylene. It is not a case here just of fillers; on the contrary, these compounds have an extremely important function in that they enable the amount of low-polymeric compound, by virtue of a synergistic effect, to be reduced to a minimum, and in that they are moreover responsible for the reversibility of the powders and of the dried pastes. The function of the low-polymeric compound, on the other hand, is to stabilise the dispersion even in a hot liquor, and to prevent recrystallisation of the dyestuff, effects which cannot be obtained with the non-volatile organic compound alone.

Summarising, it can be stated that the dye preparations according to the invention are either solid, especially at temperatures up to 50°C, or liquid, that they are stable in storage, very easily dispersed in organic solvents, and that the dye liquors prepared from the said dye preparations have a very high stability to heat; moreover, that the preparations exhibit no flocculation, even at the boiling temperature of the dye bath, and, finally, give optimum dyeing yields.

Especially interesting solid preparations consist of 10 to 50% of a finely dispersed dispersion dyestuff, 10 to 50% of a polyvinylpyrrolidone derivative and 40 to 80% of hard paraffin, while especially interesting liquid preparations consist of about 30% of a finely dispersed dispersion dyestuff, 20% of a polyvinylpyrrolidone derivative and 65% of paraffin oil.

The dyestuff preparations according to the invention are produced, e.g. by a process in which the dyestuff is worked up direct with the non-volatile organic compound, e.g. in paraffin oil, and in the presence of the low-polymeric compound, e.g. by kneading in a trough kneader, or better still by milling, e.g. in a sand mill, or in a mill containing rolls or balls. Such mills are known commercially under the name of 'Dynomühle' or 'Perlmühle'. It is also possible, however, to grind in a halogenated hydrocarbon such as perchloroethylene, and to subsequently dissolve therein the non-volatile organic compound, the halogenated hydrocarbon being then completely or partially removed. This procedure is specially recommended with respect to solid dyestuff preparations. Various processes can be applied to effect the removal of the halogenated hydrocarbon; for instance, processes such as spray drying, vacuum freeze drying, or drum drying. A further possibility is vacuum drying with a thin layer on metal sheets. In the case of powder preparations, it is important that they can be subsequently re-dispersed without residue by stirring. With pastes, however, it is essential that they do not form a deposit, and that dried paste (e.g. at the edges of the transport containers) can be re-dispersed. All these requirements are fulfilled by the dyestuff preparations according to the present invention.

Such dye preparations are employed, in particular, for the production of organic dye liquors. These have the advantage that they are easy to handle, and that the dyestuff at the boiling point of the dye bath is in an extremely finely divided and, above all, homogeneous form, in consequence of which very uniform dyeings well dyed throughout are obtained, even in the dyeing of wound packages, such as, e.g. cheeses.

If necessary, the dye liquor applicable according to the invention can also contain thickeners, advantageously ones which are soluble in the defined solvent, e.g. thickeners based on cellulose esters, polyvinyl esters or polyvinyl alcohol.

The organic dye liquors are suitable for the continuous dyeing or exhaust dyeing of synthetic organic material, particularly textile material, of the most diverse types, also in the form of mixtures with natural fibres, the dyeing being performed at the most varied stages of processing and by methods known per se. Suitable materials are, in addition to the partially synthetic fibres such as acetate silk and cellulose triacetate, fibre materials made from synthetic polyamide, the condensation products from hexamethylenediamine and adipic acid (polyamide 6.6) or sebacic acid (polyamide 6.10), or mixed condensation products, e.g. from hexamethylenediamine, adipic acid and ε-caprolactam (polyamide 6.6/6), also polymerisation products from ε-caprolactam, known under the trade-name of "Polyamide 6", "Perlon", "Grilon" or "Enkalon", or from ω-aminoundecanoic acid, "Polyamide 11" or "Rilsan".

The following may also be mentioned: acid modified synthetic fibres, such as acid modified polyamide, polyurethane and polyester fibres, and particularly polyacrylonitrile or polyacrylonitrile copolymer fibres. Where polyacrylonitrile copolymer fibres are concerned, then thee acrylonitrile part amounts preferably to at least 80 per cent by weight of the copolymer. As comonomers, other vinyl compounds are normally used besides acrylonitrile, e.g. vinylidene chloride, vinylidine cyanide, vinyl chloride, methacrylate, methylvinylpyridine, N-vinylpyrrolidone, vinylacetate, vinyl alcohol or styrenesulphonic acid, or polyolefin fibres such as "Polycrest".

Especially applicable, however, are polyester materials, such as linear high-molecular esters of aromatic polycarboxylic acids with polyfunctional alcohols, e.g. those from terephthalic acid and ethylene glycol or dimethylolcyclohexane, and mixed polymers from terephthalic acid and isophthalic acid and ethylene glycol.

Mixtures too of the mentioned fibres are applicable, especially mixtures of synthetic polyamide and polyester fibres.

The following examples illustrate the invention without this being limited by the given examples. The temperatures are expressed in degrees Centigrade. The parts denote parts by weight.

A. DYE PREPARATIONS

EXAMPLE 1

30 Parts of the dyestuff of the formula

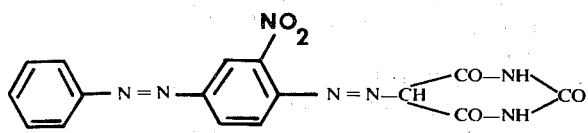

are dispersed in a solution of 6 parts of a modified polyvinylpyrrolidone (Antaron V 216) in 64 parts of paraffin oil. After the addition of 200 g of quartz sand, this dispersion is ground, as stirring is maintained, until the maximum particle size of the dyestuff is 2 $\mu$. The obtained viscous paste is then separated from the sand. The thus obtained preparation undergoes no change in storage, and can be readily dispersed in perchloroethylene. It is suitable for the dyeing of polyester fibres, at the boiling temperature, from polychloroethylene.

If, instead of 6 parts of a modified polyvinylpyrrolidone as given above, identical parts of a polyurea produced according to Example 1 or 2 of DOS No. 2,041,023 are used, with otherwise the same procedure as that described above, then an equally good dye preparation having similarly good properties is obtained.

EXAMPLE 2

10 Parts of the dyestuff according to Example 1 are ground, at a temperature of 80°, together with one part of a modified polyvinylpyrrolidone (Antaron V 220) and 89 parts of hard paraffin, M.P. 60°, with 200 g of quartz sand. After attainment of the desired degree of fineness with a maximum particle size of the dyestuff of 2 $\mu$, the sand is removed by hot filtration, and the preparation poured out to form plates. A product is obtained in this manner which crumbles into flakes, or which can be formed into granules; these can be very easily and finely dispersed in perchloroethylene.

EXAMPLE 3

10 Parts of the dyestuff according to Example 1 are ground in a solution of 1 part of Antaron V 216 and 89 parts of perchloroethylene with 200 parts of quartz sand. After attainment of the desired degree of finess with a dyestuff particle size of 2 $\mu$, the quartz sand is removed. An amount of 29 parts of paraffin oil is added to the obtained dispersion, and the perchloroethylene distilled off in vacuo. The resulting product is a viscous paste that can be easily dispersed in perchloroethylene to give dispersions which are stable on heating.

EXAMPLE 4

In a toothed disc mill, 5 parts of paraffin and 4 parts of a styrene-butadiene copolymer (Pliolite VTL) are added to 100 parts of the sand-free dispersion mentioned in Example 3. The perchloroethylene is then distilled off in vacuo and, after cooling, the thus obtained product pulverised. It can be very easily dispersed in cold perchloroethylene to give a dispersion stable to heat.

EXAMPLE 5

20 Parts of the dyestuff of the formula

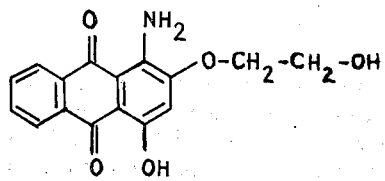

are ground in 78 parts of perchloroethylene and 2 parts of Antaron V 220 for 10 hours, with 500 revolutions, together with 200 g of Siliquarzit beads of 1 mm diameter. A dispersion is obtained of which the dyestuff particle size is smaller than 5 $\mu$. After separation of the beads, 10 parts of paraffin and 8 parts of Pliolite VTL are dissolved in the dispersion, and this then concentrated to dryness under vacuum in a rotary evaporator.

A pulverulent preparation is obtained which can be very easily dispersed cold in perchloroethylene.

EXAMPLE 6

20 Parts of the dyestuff mentioned in Example 1 are ground in 78 parts of perchloroethylene and 2 parts of Antaron V 216; the quartz sand is then removed and a dispersion thus obtained of which the dyestuff particle size is smaller than 5 $\mu$.

20 Parts of polystyrene are added, and 40 parts of perchloroethylene distilled off. The resulting product is a 25% dispersible paste stable to heat.

Instead of polystyrene, it is possible to use also, with an equally high degree of success, Pliolite VTL or Escorex or E-wax, two soluble polyolefin derivatives or carnauba wax, beeswax or paraffin.

EXAMPLE 7

10 Parts of the dyestuff according to Example 1 are ground in a solution of 2 parts of a thermoplastic polyamide (Versamid 962) in 88 parts of perchloroethylene, with the addition of 150 parts of glass balls of 5 mm diameter, until the particle size of the dyestuff is below 10 $\mu$.

After separation of the glass balls, 18 parts of a low-molecular polyethylene wax soluble in perchloroethylene are stirred in, and the perchloroethylene then removed by distillation in vacuo.

3 Parts of the thus obtained preparation are dispersed in 100 parts of perchloroethylene, and the dispersion maintained for 30 minutes at the boiling temperature. Filtration is carried out hot through a paper filter, with no residue remaining.

If, instead of Versamid 962, identical parts of Versamid 930 or Versamid 935 are used, the procedure being otherwise analogous to that described above, then similarly good preparations are obtained.

EXAMPLE 8

Fifty parts of the dyestuff of the formula

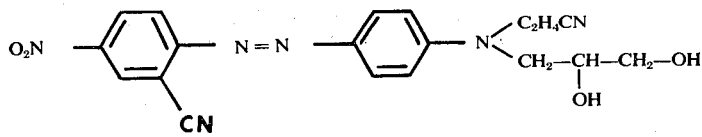

are ground together with 10 parts of Antaron V 216 and 40 parts of thinly liquid paraffin oil in a (bead-)ball mill until the particle size of the dyestuff is below 1 μ. There is obtained, after separation of the grinding medium, a 50% stable pourable dye preparation suitable for the dyeing of polyester material, by the exhaust process or by the continuous process, from organic liquors.

EXAMPLE 9

Fifteen parts of the dyestuff of the formula

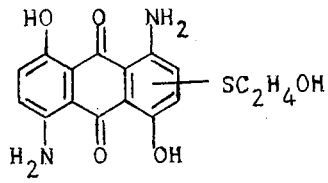

are ground together with 45 parts of Antaron V 216 and 40 parts of thinly liquid paraffin oil, the procedure being analogous to that described in Example 8. A stable dye preparation is obtained which has, compared with other preparations, the advantage that the dyeing equipment after dyeing is very easy to clean.

EXAMPLE 10

Thirty parts of the dyestuff of the formula

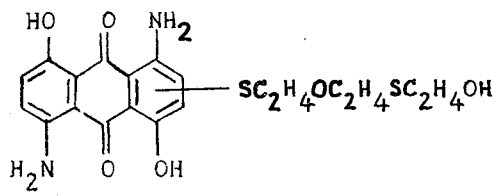

are ground together with 30 parts of Antaron V 216 and 40 parts of thinly liquid paraffin oil, the procedure being analagous to that described in Example 8. A storage-stable 30% preparation is obtained which, when processed to form a dye liquor, is very stable on heating, and which is excellently suitable for the dyeing of textured polyester, by the exhaust process, from perchloroethylene liquors.

B. DYEING PROCESS

EXAMPLE 11

An amount of 100 g of polyamide-6.6 fabric is placed into a dye bath at room temperature with a goods to liquor ratio of 1:10, the said dye bath being obtained by the dispersion of 20 g of the dye preparation according to Example 2 in 980 ml of perchloroethylene. With continuous movement of the material being dyed, the dye bath is heated to 121°, and held for 30 minutes at the boiling point of the perchloroethylene. After cooling, the material is rinsed at 80° with perchloroethylene containing 0.25% of hexamethylphosphoric acid triamide; it is again rinsed with perchloroethylene at 80°, and subsequently dried.

An even yellow dyeing is obtained.

If, instead of perchloroethylene, the same amount of trichloroethylene is used, then similarly good results are obtained.

EXAMPLE 12

An amount of 50 g of the dye preparation produced in Example 8 is diluted with perchloroethylene to 5000 ml, and the thus obtained dye liquor pumped into a closed dyeing apparatus in which is contained the cheese to be dyed in the form of 500 g of textured polyester yarn. With constant circulation of the liquor, the dye bath is heated within 15 minutes to the boiling temperature of the perchloroethylene, and dyeing performed for 35 minutes. The aftertreatment is carried out analogously to that described in Example 11. A red, evenly dyed cheese is obtained.

EXAMPLE 13

An amount of 200 g of the dye preparation according to Example 1 is dispersed in 1 litre of perchloroethylene. This dispersion is then used to impregnate a fabric made from polyethylene glycol terephthalate at room temperature; the impregnated fabric is squeezed out to ca. 100% content of solution (relative to the dry weight of the material), and dried at 40° to 80°. The fabric is afterwards thermofixed for 1 minute at 210°, and aftertreated in the usual manner.

A deeply coloured, even, well developed yellow dyeing is obtained.

EXAMPLE 14

An amount of 100 g of polyacrylonitrile fabric is placed into a dye bath at room temperature with a ratio of goods to liquor of 1:10, the said dye bath being obtained by the dispersion of 20 g of the dye preparation according to Example 5 in 980 ml of perchloroethylene. With constant movement of the material being dyed, the dye bath is heated to 121°, and maintained for 30 minutes at the boiling point of the perchloroethylene. After cooling, the dyed material is rinsed with perchloroethylene at 80° containing 0.25% of hexamethylphosphoric acid triamide; the material is again rinsed with perchloroethylene at 80°, and subsequently dried.

We claim:

1. A dyestuff preparation consisting essentially of 5 to 80% of a finely dispersed dispersion dyestuff having a maximum particle size of 10 $\mu$; 5 to 200%, relative to the amount of dyestuff, of a low-polymeric compound which is soluble in halogenated hydrocarbons, and which is a polyurea, a polyamide or a polyvinylpyrrolidone compound; and 20 to 95%, relative to the dyestuff preparation, of an inert, organic compound soluble in halogenated hydrocarbons and having a boiling point of above 200°C, said organic compound containing, in addition to carbon and hydrogen, at most, halogen atoms, or oxygen bound solely to carbon atoms, and having a molecular weight of 100 to 10,000.

2. A dyestuff preparation of claim 1, wherein the low-polymeric compound is a polyvinylpyrrolidone derivative.

3. A dyestuff preparation of claim 1, wherein the amount of low-polymeric compound present, relative to the amount of dyestuff is 10 to 50%.

4. A dyestuff preparation of claim 1, wherein the inert organic compound has a molecular weight of 150 to 5000.

5. A dyestuff preparation of claim 1, wherein the inert organic compound is paraffin oil, hard paraffin, polystyrene, polyethylene wax or beeswax.

6. A dyestuff preparation of claim 1, wherein the inert organic compound is present in an amount of 40 to 80%, relative to the dyestuff preparation.

7. A dyestuff preparation of claim 1, containing 10 to 50% of the finely dispersed dispersion dyestuff.

8. A dyestuff preparation of claim 7, wherein the dispersion dyestuff has a particle size of below 5 $\mu$.

9. A dyestuff preparation of claim 1, wherein said preparation is solid at temperatures up to 50°C, and consists essentially of 10 to 50% of the finely dispersed dispersion dyestuff, 10 to 50% of a polyvinylpyrrolidone derivative, and 40 to 80% of hard paraffin.

10. A dyestuff preparation of claim 1, wherein the inert orgainc compound is a halogenated hydrocarbon.

11. A liquid dyestuff preparation of claim 1, consisting essentially of 30% of a finely dispersed dispersion dyestuff, 20% of a polyvinylpyrrolidone derivative, relatiive to the amount of dye, and about 65% of paraffin oil.

12. A process for dyeing synthetic organic material, comprising the step of applying thereto an organic dye liquor, wherein said dye liquor comprises an organic solvent selected from the group consisting of perchloroethylene and trichloroethylene, and a dyestuff preparation containing 5 to 80% of a finely dispersed dispersion dyestuff having a maximum particle size of 10 $\mu$; 5 to 200%, relative to the amount of dyestuff, of a low-polymeric compound soluble in halogenated hydrocarbons which is a polyurea, a polyamide, or a polyvinylpryrrolidone compound; and 20 to 95%, relative to the dyestuff preparation, of an inert, organic compound soluble in halogenated hydrocarbons and having a boiling point of above 200°C, said organic compound containing, besides carbon and hydrogen, at most halogen atoms, or oxygen bound solely to carbon atoms, and possessing a molecular weight of between 100 and 10,000.

13. Dye liquor of claim 12, wherein the organic solvent is perchloroethylene.

14. The process of claim 12, wherein the synthetic organic material is textile material made from polyester, polyamide or polyacrylonitrile.

15. Synthetic organic material dyed by the process of claim 12.

* * * * *